United States Patent

Nachtkamp et al.

[11] Patent Number: 5,804,647
[45] Date of Patent: Sep. 8, 1998

[54] AQUEOUS POLYURETHANE-UREAS, A PROCESS FOR THEIR PRODUCTION AND THEIR USE IN COATING COMPOSITIONS

[75] Inventors: Klaus Nachtkamp, Düsseldorf; Oswald Wilmes, Köln; Eberhard Arning, Kaarst; Rolf Roschu, Willich, all of Germany

[73] Assignee: Bayer Aktiengesellschaft, Leverkusen, Germany

[21] Appl. No.: 804,462

[22] Filed: Feb. 21, 1997

[30] Foreign Application Priority Data

Mar. 1, 1996 [DE] Germany ............ 196 07 853.9
Mar. 26, 1996 [DE] Germany ............ 196 11 850.6

[51] Int. Cl.$^6$ .............. C08J 3/00; C08K 3/20; C08L 75/00
[52] U.S. Cl. .......... 524/591; 524/839; 524/840
[58] Field of Search .................. 524/591, 839, 524/840

[56] References Cited

U.S. PATENT DOCUMENTS 5,194,487  3/1993  Jacobs .......................... 524/591
5,212,230  5/1993  Tirpak et al. ................... 524/839

FOREIGN PATENT DOCUMENTS 157291    3/1985   European Pat. Off. .
195 06 735  8/1996  Germany .
19517185  11/1996  Germany .

OTHER PUBLICATIONS

Houben–Weyl, Methoden Der Organischen Chemie, 4th edition vol. E 20, p. 1659 (month unavailable) 1987.
J. W. Rosthauser and K. Nachtkamp in Advances in Urethane Science and Technology, K.C. Frisch and D. Klempner editors, vol. 20, pp. 121–162 (month unavailable) 1987.
D. Dietrich, K. Uhlig in Ullmann's Encyclopedia of Industrial Chemistry, vol. A21, p. 677 (month unavailable) 1992.

*Primary Examiner*—Patrick D. Niland
*Attorney, Agent, or Firm*—Joseph C. Gil; Thomas W. Roy

[57] ABSTRACT

The present invention relates to aqueous polyurethane-urea dispersions which are film forming at temperatures of $\leq 20°$ C. in the absence of film forming additives, dry at room temperature to yield films having a hardness according to DIN 53 157 (König pendulum hardness) of $\geq 100$ seconds, in which the polyurethane-ureas have a urethane group content (calculated as —NH—CO—O—, molecular weight 59) of 7 to 20 wt. %, and a urea group content (calculated as -NH-CO-N, molecular weight 57) of 5 to 18 wt. %, and contain 15–70 wt. %, based on resin solids, of structural units prepared by incorporating 1-methyl-2,4- and/or -2,6-diisocyanatocyclohexane in the form of urethane and/or urea groups. The present invention also relates to a process for the production of these aqueous polyurethane-urea dispersions and to their use in coating compositions.

4 Claims, No Drawings

AQUEOUS POLYURETHANE-UREAS, A PROCESS FOR THEIR PRODUCTION AND THEIR USE IN COATING COMPOSITIONS

BACKGROUND OF THE INVENTION

1. Field of the Invention

This invention relates to aqueous dispersions of polyurethane-ureas in which 1-methyl-2,4- and/or -2,6-diisocyanatocyclohexane is incorporated in the form of urethane and/or urea groups to a process for the preparation of these dispersions and to their use in lacquers and coating compositions.

2. Description of the Prior Art

Aqueous binders based on hydrophilically modified polyurethane-ureas are known and described, for example, in Houben-Weyl, *Methoden der organ. Chemie,* 4th edition, volume E 20, page 1659 (1987); J. W. Rosthauser, K. Nachtkamp, Advances in *Urethane Science and Technology,* K. C. Frisch & D. Klempner, editors, volume 10, pages 121–162 (1987); and D. Dietrich, K. Uhlig in *Ullmann's Encyclopedia of Industrial Chemistry,* volume A 21, page 677 (1992).

Known aqueous dispersions or solutions may be used to prepare lacquers and coatings having excellent properties which, depending upon their composition, are suitable for various applications. The range extends from hard, tough, resilient and abrasion resistant coatings, which, for example, are suitable for floor coatings, to soft, highly elastic coatings, which are suitable for textile coatings and adhesives.

Although many different polyurethane (PUR) dispersions are described in the prior art for producing coatings having widely varying properties, PUR dispersions which dry at room temperature to yield uniform, crack-free and simultaneously very hard coatings without the addition of film forming additives are not known.

Therefore, an object of the present invention is to provide water dispersible or water soluble polyurethanes, which combine the following advantages:

1. They form films at temperatures below room temperature, i.e., $\leq 20°$ C.
2. They yield hard coatings having a hardness according to DIN 53 157 (König pendulum hardness) of $\geq 100$ seconds.
3. They do not contain film forming additives.

It has now surprisingly been found that these objects may be achieved with the aqueous polyurethane-ureas dispersions according to the present invention, which contain 1-methyl-2,4- and/or -2,6-diisocyanato-cyclohexane incorporated via urethane and urea groups. Coatings prepared from these dispersions, in addition to excellent properties, exhibit (when compared to known dispersions) an elevated pendulum hardness at a low minimum film forming temperature in the absence of film forming additives. Elevated pendulum hardness at low minimum film forming temperatures is required in many applications for aqueous lacquer binders. It is thus advantageous for the minimum film forming temperature of the aqueous polyurethane-ureas to be below room temperature so that it is possible to apply purely aqueous systems in the absence of substances which promote film formation, such as organic solvents without plasticizers. A coating having elevated pendulum hardness is often desired in order to be able to use environmentally friendly, purely aqueous binders in applications requiring hard, abrasion-resistant coatings.

SUMMARY OF THE INVENTION

The present invention relates to aqueous polyurethane-urea dispersions which are film forming at temperatures of $\leq 20°$ C. in the absence of film forming additives, dry at room temperature to yield films having a hardness according to DIN 53 157 (König pendulum hardness) of $\geq 100$ seconds, in which the polyurethane-ureas have a urethane group content (calculated as —NH—CO—O—, molecular weight 59) of 7 to 20 wt. %, and a urea group content (calculated as —NH—CO—N, molecular weight 57) of 5 to 18 wt. %, and contain 15 to 70 wt. %, based on resin solids, of structural units corresponding to formula (I)

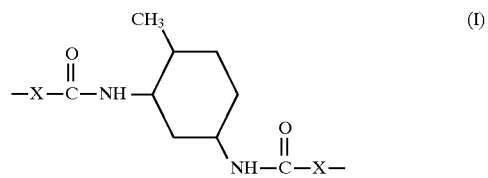

and/or formula (II)

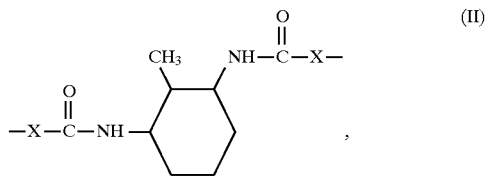

wherein x represents O or NA,

A represents H or $(CH_2)_n$—B,

B represents H or X and n is 2 or 3.

The present invention also relates to a process for the production of these aqueous polyurethane-urea dispersions by reacting A) 20 to 60 wt. % of a polyisocyanate component containing 50 to 100 wt. % of 1-methyl-2,4- and/or -2,6-diisocyanatocyclohexane and 0 to 50 wt. % of other organic polyisocyanates having a molecular weight of 140 to 1500 with B) 20 to 60 wt. % of a polyol component containing one or more polyols having an OH number of 25 to 350, C) 2 to 12 wt. % of a component containing one or more compounds containing at least one isocyanate-reactive group and at least one group capable of salt formation, which may optionally be at least partially neutralized, D) 0 to 12 wt. % of a nonionic hydrophilic component containing one or more compounds which are mono- or difunctional in isocyanate addition reactions and contain at least one hydrophilic polyether chain, E) 0 to 15 wt. % of one or more polyhydric alcohols having 2 to 4 hydroxyl groups and molecular weight of 62 to 250, F) 0 to 15 wt. % of one or more (cyclo)aliphatic polyamines having 2 to 3 amino groups and a molecular weight of 60 to 300 and G) 0 to 10 wt. % of chain-terminating compounds selected from monoamines, alkanolamines and ammonia, in which the percentages of A) to G) add up to 100, based on the weight of A) to G).

The present invention additionally relates to the use of these aqueous polyurethane-urea dispersions for the production of lacquers and coating compositions.

DETAILED DESCRIPTION OF THE INVENTION

Component A) is selected from organic polyisocyanates having a molecular weight of 140 to 1500, preferably 168 to 318, providing that they contain 50 to 100, preferably 75 to 100 and more preferably 100 wt. % of 1-methyl-2,4-diisocyanato-cyclohexane and/or 1-methyl-2,6-diisocyanatocyclohexane. This diisocyanate or diisocyanate mixture is preferably based on the 2,4-diisocyanate isomer or mixtures thereof with up to 35 wt. %, based on the weight of the mixture, of the 2,6-diisocyanate isomer. These diisocyanates are known and may be produced by gas phase phosgenation as described in DE-A P 4,412,327.

In addition to these required diisocyanates, component A) may also contain 0 to 50, preferably 0 to 25 wt. % of other diisocyanates. Examples include hexamethylene diisocyanate (HDI), 1-isocyanato-3,3,5-trimethyl-5-isocyanatomethylcyclohexane (IPDI), 2,4- and/or 2,6-diisocyanatotoluene (TDI), 4,4'-diisocyanatodicyclohexylmethane ($H_{12}$MDI) and 4,4'-diisocyanatodiphenyimethane (MDI). Polyisocyanate component B) may also contain the known, more highly functional lacquer polyisocyanates based on HDI, IPDI and/or TDI, although this is less preferred.

Starting component B) is selected from high molecular weight polyhydroxyl compounds, which are known from polyurethane chemistry and preferably have a number average molecular weight (which may be calculated by end group analysis) of 300 to 5000, more preferably 500 to 3000. Examples include
1) dihydroxypolyesters prepared from dicarboxylic acids such as succinic acid, adipic acid, suberic acid, azelaic acid, sebacic acid, phthalic acid, isophthalic acid, terephthalic acid and tetrahydrophthalic acid; and diols such as ethylene glycol, 1,2-propanediol, 1,3-propanediol, diethylene glycol, 1,4-butanediol, 1,6-hexanediol, 1,8-octanediol, neopentyl glycol, 2-methyl-1,3-propanediol and the isomeric bishydroxymethylcyclohexanes;
2) polylactones such as those based on ε-caprolactone initiated with the previously described diols;
3) polycarbonates obtained by reacting the previously described diols with diaryl carbonates or phosgene; and
4) polyethers obtained by the addition of tetrahydrofuran, styrene oxide, propylene oxide, ethylene oxide, butylene oxides or epichlorohydrin (preferably propylene oxide and optionally ethylene oxide) onto divalent starter molecules such as water, the previously described diols and amines containing 2 NH bonds. If ethylene oxide is used, the resultant polyether diols should contain a maximum of 10 wt. % of ethylene oxide units. The polyether diols are preferably those obtained without using ethylene oxide, i.e., in particular, those obtained exclusively using propylene oxide and/or tetrahydrofuran.

In addition to these relatively high molecular weight difunctional compounds, component B) may also contain trifunctional or higher functional polyhydroxyl compounds, in particular polyether polyols prepared from higher functional starting materials such as trimethylolpropane, glycerol or ethylenediamine.

It is also possible, although less preferred, to use polyether polyamines obtained by converting the hydroxyl groups of polyether polyols into primary amino groups.

Component C) is selected from compounds containing ionic or potential ionic groups and at least one isocyanate-reactive groups. These compounds are preferably carboxylic acids containing at least one, preferably one or two hydroxyl or amino groups or the corresponding salts of these amino- or hydroxycarboxylic acids. Suitable acids include 2,2-bis(hydroxymethyl)alkanecarboxylic acids, such as dimethylolacetic acid, 2,2-dimethylolpropionic acid, 2,2-dimethylbutyric acid, 2,2-dimethylolpentanoic acid, dihydroxysuccinic acid, hydroxypivalic acid and mixtures of these acids. Dimethylolpropionic acid and/or hydroxypivalic acid are preferably used as component C). It is also possible, although less preferred, to use sulphonate diols also containing ether groups, such as those described in U.S. Pat. No. 4,108,814, as anionic structural component C). The free acid groups, in particular carboxylic acid groups, represent "potential" anionic groups, while salt groups, in particular carboxylate groups, obtained by neutralizing the potential anionic groups with bases represent anionic groups.

Component C) is also selected from compounds, which are mono-or difunctional in the isocyanate addition reaction and contain incorporated tertiary amine nitrogen atoms, e.g., those described in DE-A 2,651,505 or 2,019,324. After incorporation into the polyurethane-ureas, the tertiary amines are converted into the corresponding ammonium ions by quaternization and/or neutralization. Examples of suitable compounds include those set forth in DE-A 2,651,505, e.g. N-alkyldiethanolamines, such as for example N-methyldiethanolamine. Also suitable are glycols containing tertiary amine nitrogen, e.g, those described in DE-A 2,019,324, such as 2-ethyl-2-dimethylaminomethyl-1,3-propanediol, 2-ethyl-2-diethylamino-methyl-1,3-propanediol, 2-ethyl-2-dibutyl-aminomethyl-1,3-propanediol, 2-methyl-2-dimethylaminomethyl-1,3-propanediol, 2-methyl-2-diethylamino-methyl-1,3-propanediol and 2-methyl-2-dibutylaminomethyl-1,3-propanediol.

The tertiary amino groups represent "potential" cationic groups, which may be converted into cationic groups using the quaternization agents or acids described in DE-A 2,651,505.

Optional component D) is selected from nonionic hydrophilic compounds which contain one or two isocyanate-reactive groups, in particular hydroxyl or amino groups. The polyether chains of these compounds contain at least 80 wt. % of ethylene oxide units, and may also contain other alkylene oxide units such as propylene oxide units. Such suitable nonionic hydrophilic structural components include monofunctional polyethylene glycol monoalkyl ethers having number average molecular weights of 350 to 5000 (for example Breox 350, 550, 750, available from BP Chemicals) as well as the monofunctional compounds having isocyanate-reactive group described in DE-A 30 2,651,506 (U.S. Pat. No. 4,237,264, herein incorporated by reference).

Other nonionic hydrophilic structural components suitable as component D) are the diisocyanates and/or difunctional isocyanate-reactive compounds, which have lateral hydrophilic chains containing ethylene oxide units and are described in DE-A 2,551,094 (U.S. Pat. No. 4,092,286, herein incorporated by reference).

Optional component E) is selected from di-, tri- and/or tetrafunctional compounds having a molecular weight of 62 to 250 and containing hydroxyl groups, such as ethylene glycol, propylene glycol, 1,4-butanediol, 1,6-hexanediol, glycerol, trimethylolpropane, trimethylolethane, the isomeric hexanetriols and pentaerythritol.

Optional component F) is selected form di-, tri- and/or tetrafunctional compounds having a molecular weight of 60 to 300 and containing amino groups, such as ethylenediamine, 1,2- and 1,3-diaminopropane, 1,6-diaminohexane, 1,3-diamino-2,2-dimethylpropane, isophoronediamine, 1,3- and 1,4-diaminohexane, 4,4'-diaminodicyclo-hexylmethane, 2,4- and/or 2,6-diamino-1-methylcyclohexane, 4,4'-diamino-3,3'-dimethyldicyclohexylmethane, 1,4-bis(2-amino-2-propyl)- cyclohexane, 3,3'-dimethyl-4,4'-diaminodicyclohexylmethane; hydrazine and hydrazides; higher functional polyamines such as diethylenetriamine, triethylenetetramine, dipropylenetriamine and tripropylenetetramine; hydrogenated addition products of acrylonitrile onto aliphatic or cycloaliphatic diamines, preferably addition compounds of acrylonitrile group onto a triamine, for example, hexamethylenepropylenetriamine, tetramethylenepropylenetriamine, isophoronepropylenetriamine, 1,4- or 1,3-cyclohexanepropylenetriamine; and mixtures thereof.

Optional component G) includes compounds, which are monofunctional for the purposes of the isocyanate addition reaction, do not contain ethylene oxide units. The phrase "monofunctional for the purposes of the isocyanate addition reaction" includes compounds which may contain more than one isocyanate-reactive group, provided that one of the groups is distinctly more reactive towards isocyanate groups than the other, such that the compounds react monofunctional compounds.

Examples of suitable compounds include ammonia and monofunctional amines having molecular weights of 31 to 200, such as methyl-, ethyl-, n-propyl- and isopropylamine, cyclohexylamine, cyclooctylamine and diethylamine; and aminoalcohols, such as ethanolamine, diethanolamine and propanolamine. The aminoalcohols are examples of compounds having two isocyanate-reactive groups that react like monofunctional compounds.

Structural components G) are optionally used to bring about a possible chain termination.

The polyurethane-ureas are produced in one or more stages from starting components A) to G) in known manner. The amounts of the reactants are selected such that the equivalent ratio of isocyanate groups of component A) to isocyanate-reactive groups of components B), C), D), E), F) and G) is 0.8:1 to 2:1, preferably 0.95:1 to 1.5:1 and more preferably 0.95:1 to 1.2:1. Neither the carboxyl groups of component C), nor the water used to produce solutions or dispersions of the polyurethane-ureas, nor the neutralizing agent used to neutralize the potential ionic groups are included when calculating this equivalent ratio.

Component D) is used in an amount such that 0 to 30, preferably 1 to 20 wt. % of ethylene oxide units are incorporated within polyether chains in the polyurethanes obtained according to the invention.

The amount of component C) and the degree of neutralization of the (potential) ionic groups are selected such that 0.1 to 120, preferably 1 to 80 milliequivalents of ionic groups, preferably carboxylate groups, per 100 g of solids are present in the polyurethane-urea. The total amount of ethylene oxide units and carboxylate groups must be selected to ensure hat the polyurethane is water soluble or water dispersible.

In one embodiment of the present invention the amounts of starting components A) to F) are calculated such that when the reaction of these components is complete, a maximum of 10, preferably 5 wt. %, based on solids, of free, unreacted isocyanate groups are present in the resulting polyurethanes. Optional monofunctional component G) is then preferably used in an amount of up to that which corresponds to the quantity of free isocyanate groups present after the reaction of starting components A) to F).

Starting components A) to G) may be reacted in one or more stages. It is possible to use a water-miscible solvent, which is inert towards isocyanate groups, such that the reaction products ultimately take the form of a solution in such a solvent. The term "solution" means both a true solution and a water-in-oil emulsion which may arise if, for example, some of the structural components are used in the form of aqueous solutions.

Suitable solvents include acetone, methyl ethyl ketone, N-methylpyrrolidone and any desired mixtures of such solvents. The quantity of these solvents is generally calculated such that at least 10 wt. % solutions of the reaction products of starting components A) to G) are obtained in the solvent. The solvents used are preferably those sufficiently volatile to be removed by distillation.

It is an advantage of the polyurethanes according to the invention that they yield the hard coatings at a film forming temperature below room temperature without the addition of substances which promote film formation, such as organic solvents.

The polyurethane-ureas according to the invention may be produced in the absence or presence of catalysts. Suitable catalysts are those conventionally used in polyurethane chemistry, e.g., tertiary amines such as triethylamine; and tin compounds such as tin(II) octoate, dibutyltin oxide and dibutyltin dilaurate.

Suitable processes for the production of the polyurethane-urea dispersions or solutions according to the invention are those described, e.g, in D. Dietrich: Houben-Weyl, *Methoden der organ. Chemie*, 4th edition, volume E 20, page 1650 (1987)). Examples of these processes include the prepolymer mixing process, the acetone process and the ketimine/ketazine process.

If the component C) contains carboxylic acid groups, the neutralizing agent for at least partial neutralizing these groups may be added before, during or after the addition of water. If 1) the reaction products of starting components A) to G) still contain free isocyanate groups,
2) the base is added before or simultaneously with water such that the free isocyanate groups have no opportunity to react with the dispersion water and
3) the base is reactive with isocyanate groups, then the quantity of base must be calculated such that it is sufficient to achieve not only the desired degree of neutralization, but also to react with any free isocyanate groups still present by chain termination. The free isocyanate group content of the reaction products of A) to G) is 0 to 10, preferably 0 to 5 wt. %, based on resin solids.

Suitable bases include ammonia, N-methylmorpholine, dimethylisopropanolamine, triethylamine, dimethylethanolamine, methyldiethanolamine, triethanolamine, morpholine, tripropylamine, ethanolamine, triisopropanolamine, 2-diethylamino-2-methyl-1-propanol and mixtures of these and other neutralizing agents. Sodium hydroxide, lithium hydroxide and potassium hydroxide are also suitable as neutralizing agents. Ammonia and dimethylethanolamine are preferred neutralizing agents.

If a compound containing potential cationic groups is used as component D), then the procedure described above for the addition of base shall apply to the acidic neutralizing agents. Suitable acids include those mentioned DE-A 2,651,505 or in DE-A 2,019,324.

If potential cationic component C) is converted into ionic form by quaternization, the procedure is similar to that described in DE-A 2,651,505. Suitable quaternizing agents may also be found in DE-A 2,651,505, for example, dimethyl sulphate and chloroacetamide.

The water, which acts as solvent or dispersing medium, is added in an amount such that 10 to 60, preferably 20 to 45 wt. % solutions or dispersions are obtained. After the addition of water, at least a portion of any solvent may optionally be removed by distillation.

The resulting polyurethanes are obtained in the form of aqueous solutions or dispersions, in which the average particle diameter is approximately 10 to 1000 nm, preferably 30 to 500 nm.

It is possible to use quantities of tri- and polyfunctional structural components, in particular crosslinking agents E) and/or F), such that highly branched polyurethanes are obtained instead of substantially linear polyurethanes.

The aqueous solutions and dispersions of the polyurethanes according to the invention are frost resistant and stable in storage and may be diluted with water to any concentration. In the event that terminal urea groups are present, e.g, from the reaction of terminal isocyanate groups with ammonia, the polyurethanes have reactive sites which may used for crosslinking reactions. Thus, it is possible, for example, to convert terminal urea groups with formaldehyde into methylol groups, which may then be crosslinked with suitable crosslinking agents, such as melamine resins.

The solutions or dispersions of the polyurethanes according to the invention may undergo curing at any desired time after their production. They generally dry directly to yield dimensionally stable coatings.

Depending upon the chemical composition and content of urethane and urea groups, polyurethanes having various properties are obtained. It is possible to produce products having varying degrees of hardness. The polyurethane-ureas according to the invention are preferably suitable for the production of hard products, which have a low minimum film forming temperature. The hydrophilic properties of the products may also vary within certain limits.

The products according to the invention are suitable for coating any desired substrates, in particular wood, metals, ceramics, stone, concrete, bitumen, hard fibers, glass, porcelain and various plastics. They are also suitable as a finish or dressing in textile and leather coatings. Preferred areas of application are those demanding increased hardness of the coating after drying at room temperature or at slightly elevated temperature, such as coatings for the construction industry (concrete, parquet, etc.), wood/furniture coatings, automotive refinish coatings and coatings for plastics.

The dispersions may be blended with other ionic or nonionic dispersions, for example, polyvinyl acetate, polyethylene, polystyrene, polybutadiene, polyvinyl chloride, polyacrylate and copolymer plastic dispersions. It is also possible to use known external emulsifiers, preferably ionic emulsifiers.

Known additives may also be added to the dispersions according to the invention depending upon their intended use. Examples include crosslinking agents such as carbodiimides, blocked polyisocyanates and mixtures thereof with partially or completely etherified melamine resins, pigments, for example, metallic pigments based on aluminum flakes; and fillers such as carbon black, silica, talcum, kaolin, titanium dioxide, glass in the form of powder or fibers, cellulose and cellulose acetobutyrate.

In order to produce coatings, the dispersions may be applied using any known methods, such as brushing, pouring, spraying, dipping, roller or knife application. The coatings obtained using the various application techniques may be dried at room temperature or at elevated temperatures of up to 200° C.

EXAMPLES

In the following examples, all parts and percentages are by weight, unless other indicated.

Example 1

153 parts of a polyester prepared from adipic acid, 1,6-hexanediol and 2,2-dimethyl-1,3-propanediol (molar ratio of diols 65:35) and having an OH number of 66 were mixed with 231 parts of a polyester prepared from adipic acid and 1,6-hexanediol and having an OH number of 133, 45 parts of a monofunctional polyether alcohol having an OH number of 26 (produced by alkoxylating n-butanol with a mixture of 83% ethylene oxide and 17% propylene oxide) and 53.6 parts of 2,2-dimethylol-propionic acid. The resulting mixture was combined at 65° C. with 396 parts of a mixture of 80% 1-methyl-2,4-diisocyanatocyclohexane and 20% 1-methyl-2,6-diisocyanatocyclohexane ("H$_6$TDI") and reacted at 75° C. until the NCO content of the NCO prepolymer had fallen to 14.6%.

The mixture was cooled to 65° C. and then 33.75 parts of 1,4-butanediol and 13.4 parts of trimethylolpropane were added and the mixture was stirred at 75° C. until the NCO content of the mixture had fallen to 8.0%. The resultant prepolymer was dissolved in 2000 parts of acetone.

At 40° C. a solution of 42.0 parts of ethylenediamine and 19.1 parts of a 25% ammonia solution in 560 parts of deionized water was added and stirred. A further 14.3 parts of the 25% aqueous ammonia solution were then added.

Dispersion was achieved by vigorously stirring in 1222 parts of demineralized water. The acetone was then removed by vacuum distillation. Once an acetone content of <1 % was achieved, the dispersion was adjusted to a solids content of 35%.

| | |
|---|---|
| Draining time (4 mm nozzle) | 40 sec |
| pH | 6.95 |

Example 2

Comparison Example 153 parts of a polyester prepared from adipic acid, 1,6-hexanediol and 2,2-dimethyl-1,3-propanediol (molar ratio of diols 65:35) and having an OH number of 66 were mixed with 231 parts of a polyester prepared from adipic acid and 1,6-hexanediol and having an OH number of 45 parts of a monofunctional polyether alcohol having an OH number of 26 (produced by alkoxylating n-butanol with a mixture of 83% ethylene oxide and 17% propylene oxide) and 53.6 parts of 2,2-dimethylolpropionic acid. The resulting mixture was combined with 488.4 parts of 3-isocyanatomethyl-3,5,5-trimethylcyclohexyl isocyanate (IPDI) and reacted at 75° C. until the NCO content of the resultant NCO prepolymer had fallen to 13.6%.

The mixture was cooled to 65° C. and then 33.75 parts of 1,4-butanediol and 13.4 parts of trimethylolpropane were added and the mixture was stirred at 75° C. until the NCO content of the mixture had fallen to 7.4%. The resulting prepolymer was dissolved in 2000 parts of acetone.

At 40° C. a solution of 42.0 parts of ethylenediamine and 19.1 parts of a 25% ammonia solution in 560 parts of deionized water was added and stirred. A further 14.3 parts of a 25% aqueous ammonia solution were then added.

Dispersion was achieved by vigorously stirring in 1400 parts of demineralized water. The acetone was then removed by vacuum distillation. Once an acetone content of <1 % was achieved, the dispersion was adjusted to a solids content of 35%.

| | |
|---|---|
| Draining time (4 mm nozzle) | 20 sec |
| pH | 7.5 |

Example 3

Matt clear coating compositions having the following composition were formulated with the polyurethane-urea dispersions described in Examples 1 and 2:

| | |
|---|---|
| 75.0 parts | of polyurethane-urea dispersion according to Example 1 or 2 |
| 0.9 parts | of a substrate wetting agent (silicone surfactant, BYK 348, available from Byk-Chemie GmbH, Wesel) |
| 0.5 parts | of a levelling agent (BYK 380 available from Byk-Chemie GmbH, Wesel) |
| 0.1 parts | of a deaerating agent (BYK 023, available from Byk-Chemie GmbH, Wesel) and |
| 23.5 parts | of a thickening agent to improve processability (acrylate copolymer, Acrysol ASE 60, available from Rohm & Haas Deutschland GmbH, Frankfurt). |

Matt clear lacquers were also produced which additionally contained 5 parts of methoxypropanol, based on the weight of the coating composition. In a product having a higher minimum film forming temperature, the addition of methoxypropanol reduces the minimum film forming temperature while retaining the remaining lacquer properties.

The following test results were obtained from lacquer films having a dry film thickness of 40 μm:

TABLE 1

| | König pendulum hardness [S][a] after 7 days | Minimum film forming temperature [°C.][b] |
|---|---|---|
| PUR dispersion of Example 1 (according to the invention) | 151 | 4 |
| PUR dispersion of Example 1 (according to the invention) + 5% methoxypropanol | 150 | 2 |
| PUR dispersion of Example 2 (Comparison Example) | (No film formation at room temperature) | 25 |
| PUR dispersion of Example 2 (Comparison Example) + 5% methoxypropanol) | 154 | 12 |

[a]Determined according to DIN 35157
[b]Determined according to DIN 53787.

SUMMARY OF RESULTS

Table 1 demonstrates that hard coatings, which also had a low minimum film forming temperature were obtained from polyurethane-urea dispersions containing $H_6TDI$ as the isocyanate component.

In contrast, the polyurethane-urea dispersion based on IPDI exhibited no film formation at room temperature. It was necessary to add methoxypropanol to reduce the minimum film forming temperature to approximately 12° C.

The pendulum hardness values of the coatings based on the polyurethane-urea dispersions according to the invention and the comparison example were virtually identical. It is apparent that the addition of methoxypropanol does not affect pendulum hardness, but is undesirable for environmental reasons.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane-urea dispersion which is film forming at temperatures of $\leq 20°$ C. in the absence of film forming additives, dries at room temperature to yield films having a hardness according to DIN 53 157 (König pendulum hardness) of $\geq 100$ seconds, in which the polyurethane-urea has a urethane group content (calculated as —NH—CO—O—, molecular weight 59) of 7 to 20 wt. %, and a urea group content (calculated as —NH—CO—N , molecular weight 57) of 5 to 18 wt. %, and contains 15 to 70 wt.%, based on resin solids, of structural units corresponding to formula (I)

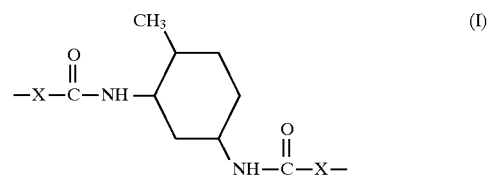

and/or of the formula (II)

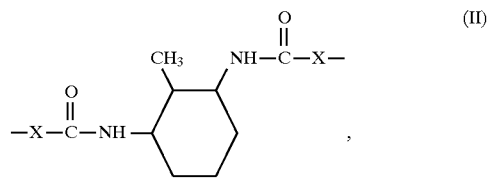

wherein
x represents O or NA,
A represents H or $(CH_2)_n$—B,
B represents H or X and
n is 2 or 3.

2. The aqueous polyurethane-urea dispersion of claim 1 wherein the polyurethane-urea comprises the reaction product, present at least partially in salt form of
  A) 20 to 60 wt. % of a polyisocyanate component containing 50 to 100 wt. % of 1-methyl-2,4- and/or -2,6-diisocyanatocyclohexane and 0 to 50 wt. % of other organic polyisocyanates having a molecular weight of 140 to 1500 with
  B) 20 to 60 wt. % of a polyol component containing one or more polyols having an OH number of 25 to 350,
  C) 2 to 12 wt. % of a component containing one or more compounds containing at least one isocyanate-reactive group and at least one group capable of salt formation, which may optionally be at least partially neutralized,
  D) 0 to 12 wt. % of a nonionic hydrophilic component containing one or more compounds which are mono- or difunctional in isocyanate addition reactions and contain at least one hydrophilic polyether chain,
  E) 0 to 15 wt. % of one or more polyhydric alcohols having 2 to 4 hydroxyl groups and molecular weight of 62 to 250,
  F) 0 to 15 wt. % of one or more (cyclo)aliphatic polyamines having 2 to 3 amino groups and a molecular weight of 60 to 300 and
  G) 0 to 10 wt. % of chain-terminating compounds selected from monoamines, alkanolamines and ammonia,
in which the percentages of A) to G) add up to 100, based on the weight of A) to G).

3. A process for the preparation of an aqueous polyurethane-urea dispersion which is film forming at temperatures of ≦20° C. in the absence of film forming additives, dries at room temperature to yield films having a hardness according to DIN 53 157 (König pendulum hardness) of ≧100 seconds, in which the polyurethane-urea has a urethane group content (calculated as —NH—CO—O—, molecular weight 59) of 7 to 20 wt. %, and a urea group content (calculated as —NH—CO—N, molecular weight 57) of 5 to 18 wt. %, and contains 15 to 70 wt. %, based on resin solids, of structural units corresponding to formula (I)

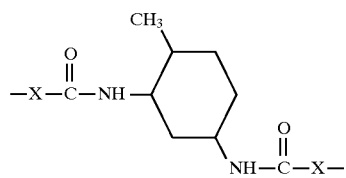

and/or of the formula (II)

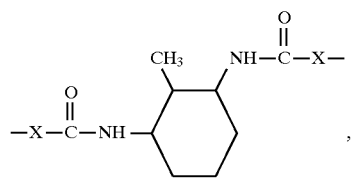

wherein x represents O or NA,

A represents H or $(CH_2)_n$—B,

B represents H or XH and n is 2 or 3, which comprises reacting

A) 20 to 60 wt. % of a polyisocyanate component containing 50 to 100 wt. % of 1-methyl-2,4- and/or -2,6-diisocyanatocyclohexane and 0 to 50 wt. % of other organic polyisocyanates having a molecular weight of 140 to 1500 with B) 20 to 60 wt. % of a polyol component containing one or more polyols having an OH number of 25 to 350, C) 2 to 12 wt. % of a component containing one or more compounds containing at least one isocyanate-reactive group and at least one group capable of salt formation, which may optionally be at least partially neutralized, D) 0 to 12 wt. % of a nonionic hydrophilic component containing one or more compounds which are mono- or difunctional in isocyanate addition reactions and contain at least one hydrophilic polyether chain, E) 0 to 15 wt. % of one or more polyhydric alcohols having 2 to 4 hydroxyl groups and molecular weight of 62 to 250, F) 0 to 15 wt. % of one or more (cyclo)aliphatic polyamines having 2 to 3 amino groups and a molecular weight of 60 to 300 and G) 0 to 10 wt. % of chain-terminating compounds selected from monoamines, alkanolamines and ammonia, in which the percentages of A) to G) add up to 100, based on the weight of A) to G).

4. A coating composition containing the aqueous polyurethane-urea dispersion of claim 1.

* * * * *